April 3, 1956      J. S. BONE      2,740,821

BATTERY CONSTRUCTION

Filed Nov. 29, 1954

INVENTOR.
James S. Bone.
BY
Wood, Herron & Evans.
ATTORNEYS.

United States Patent Office 2,740,821
Patented Apr. 3, 1956

2,740,821

BATTERY CONSTRUCTION

James S. Bone, Joplin, Mo., assignor to The Eagle-Picher Company, Cincinnati, Ohio, a corporation of Ohio Application November 29, 1954, Serial No. 471,686

2 Claims. (Cl. 136—111)

This invention relates to the manufacture of batteries and particularly to the construction of a battery which utilizes a silver peroxide, sponge zinc and aqueous caustic potash electrochemical system. Further, the invention relates to a pile-type battery suitable for use on airborne equipment, which provides high output of electrical power in relation to the weight of the battery, in comparison, for instance, with a conventional lead acid storage battery. In the type of battery of this invention it is desirable to absorb the electrolyte on bibulous fibrous diaphragms or pads which serve as electrode separators, and it is also desirable to employ no independent battery case for housing the electrodes and electrolyte. A battery of this general type is disclosed in copending application Serial No. 311,688, filed September 26, 1952, and a somewhat analogous method of constructing batteries (with any desired type of electrochemical system) is disclosed in copending application Serial No. 311,687, filed September 26, 1952.

In the latter of these applications a pile type of battery is constituted by forming a stack of electrodes, bibulous electrode separators, sheet plastic cell partitions and sheet plastic end plates, then depositing a thermally hardening plastic material on at least two opposing sides of the stack to hold the elements together. The plastic cell separating partitions and the plastic end plates are chosen in respect to the thermally setting plastic to provide a compatible system of plastics, that is, a combination of plastics which provides permanent bonding between the thermally setting plastic side walls and the cell separating partitions and the end plates.

The cells of a pile battery of this type may be connected in series or in parallel, or partly one way and partly the other to provide any desired electrical output. In any case, however, the electrical connections between the cells must be soldered or welded, or otherwise securely attached to the electrodes or the electrode grids, and if the battery is a series, pile battery then a single faulty connection or a connection which becomes faulty in shipment or service renders the battery inoperative. If batteries of the type in question are used on airborne equipment for military purposes, battery failure is particularly undesirable and the possibility of battery failure is worth avoiding at all costs. Also, batteries for purposes of the type indicated may be subjected to very severe physical stresses which necessitate particularly rugged construction.

The object of the present invention is to provide a pile-type, series connected, silver peroxide, sponge zinc, potassium hydroxide battery which is characterized by physical ruggedness, dependability, and high electrical power output in relation to the weight of the battery.

The battery is more particularly disclosed in the accompanying drawing, in which.

Figure 1:
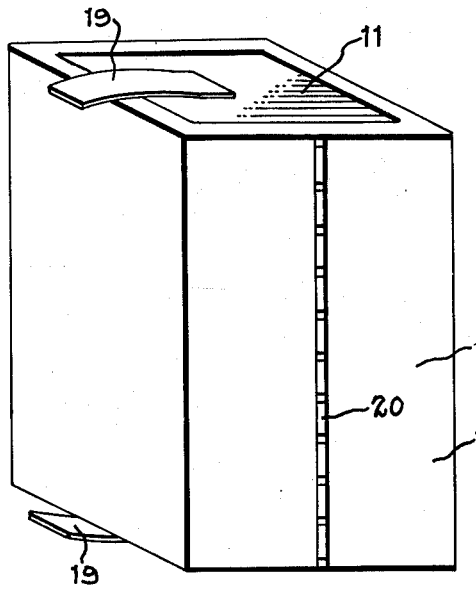
Figure 1 is a perspective view of the battery.
Figure 2:
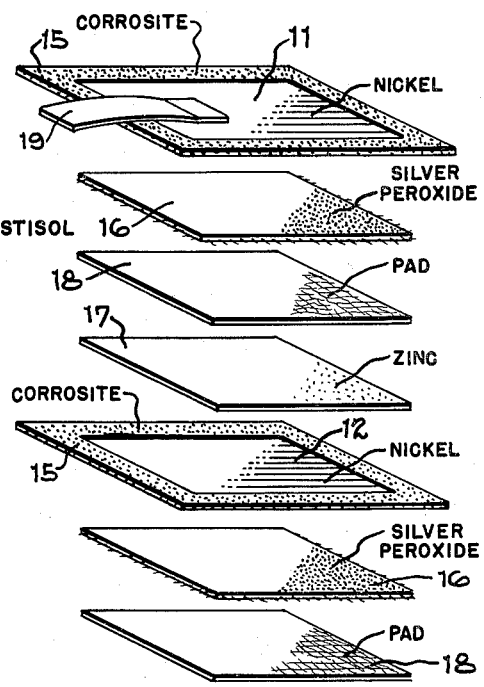
Figure 2 is an exploded view which discloses the arrangement of the elements which constitute the pile.
Figure 3:
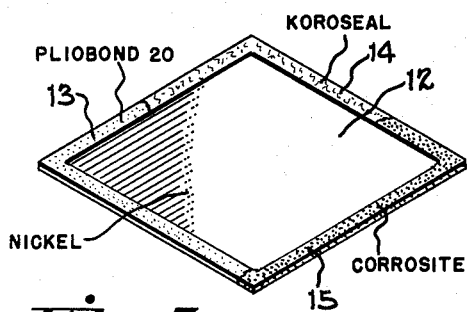
Figure 3 is a diagrammatic view which discloses the treatment of the cell partitions.
Figure 4:
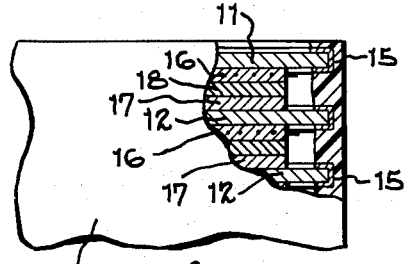
Figure 4 is a side elevation of the battery, partly in section.

The novel feature of the battery of this invention involves the use of metallic cell partitions and, if desired, metallic end plates in a series connected, pile type of battery which utilizes porous silver peroxide positive electrodes, sponge zinc negative electrodes, bibulous electrode separators and an aqueous potassium hydroxide solution as electrolyte. Other caustic electrolyte solutions may be used in place of the one designated, as is well known in the art. The metallic cell partitions, as distinguished from plastic cell partitions, are desirable because their use eliminates the necessity of electrical connections between the positive electrode of one cell and the negative electrode of the adjacent cell. The use of the metallic cell partitions is also desirable because they impart greater strength and durability to the battery than if plastic cell partitions are employed.

However, the chemical nature of the metal chosen for the cell partitions must be such that it does not modify or enter into the complex electrochemical reactions which produce the useful current. On this account, nickel cell partitions are highly desirable. Alternatively, the cell partitions may be fabricated from sheet steel, sheet brass or sheet copper and plated with nickel to provide an impervious layer which protects the base metal chemically.

It is particularly desirable to house a battery of the type disclosed in a very light, tough plastic case. A case of the type disclosed in the above identified copending applications is satisfactory for this purpose. Such a case comprises the copolymer of vinyl chloride and vinyl acetate plasticized with a solvent plasticizer, such as dioctyl phthalate combined with an ester of ricinoleic acid. Such a plastic has a setting temperature in the neighborhood of 350° F. After being thermally set, this product becomes a tough, horn-like, resilient mass which is slightly flexible but which tends to retain shape and which will withstand shock without cracking. The finished product is not readily stretchable and has substantial rigidity, yet it is distinctly different physically from the ordinary brittle plastic of the Bakelite or polystyrene types. If desired, sheet plastic side and end walls may be used as the exterior surfaces, as disclosed in the copending applications hereinbefore identified.

The problem with which the present invention is particularly involved is constituted by the circumstance that this preferred type of thermally setting plastic does not adhere to a nickel surface. To avoid this difficulty the edge portions of the nickel cell partitions and the nickel end plates are coated with Pliobond 20, a composition comprising phenolic resin and a nitrile rubber, that is, a rubbery butadiene-acrylonitrile copolymer, dispersed in methyl ethyl ketone solvent, which composition is manufactured and sold under that trade name by the Goodyear Tire & Rubber Company of Akron, Ohio. The Pliobond 20 adheres very satisfactorily to the nickel and only a thin coating such as may be provided by dipping the edges of the plate to a slight depth such as ⅛ or ¼ of an inch, then draining and drying is required. However, the vinyl plastisol does not adhere to Pliobond 20, so the treatment is repeated with Koroseal, a rubber solution containing a plasticizer, solvent, and stabilizer which is manufactured and sold under that trade name by the B. F. Goodrich Company of Akron, Ohio. In other words, a thin Koroseal film is deposited over the Pliobond 20 film. The Koroseal adheres admirably to the Pliobond 20, which adheres to the nickel. But the vinyl plastisol does not adhere to Koroseal so the edge dipping treatment is again repeated with Corrosite, a solution containing a plasticized vinyl resin and high boiling point solvent, which is manufactured and sold under that trade name by the Corrosite Corporation of Brooklyn 11, New York. Thus, three films (Pliobond 20, Koroseal and Corrosite) are deposited successively over the edges of the nickel plates. The thermally setting vinyl plastisol adheres very satisfactorily to the outer Corrosite film, both when applied as a soft plastic and after the plastisol is set thermally at a temperature such as 350° F.

The battery disclosed in the drawings comprises an outer, thermally set, light, thin, tough plastisol casing 10. Imbedded in the plastisol casing are nickel end plates 11 and nickel cell partitions 12. The end plates and cell partitions are formed of sheet nickel and the edge of each is provided with three coatings: A Pliobond 20 film 13, over which is disposed a Koroseal film 14, which in turn is covered by an outer Corrosite film 15. The Corrosite edge coatings 15 are imbedded in the plastisol casing 10.

In between each pair of cell partitions and between each terminal cell partition and the adjacent end plate of the battery is an electrode assembly adapted to constitute an electrolytic cell. As disclosed, each cell assembly comprises a positive plate 16, a negative plate 17, and a bibulous electrode separator 18. The details of these assemblies are not herein discussed inasmuch as they are fully disclosed in copending application Serial No. 311,688, filed September 26, 1952. However, the silver peroxide positive plate comprises a porous mass of silver peroxide fastened upon a metallic screen or grid. Preferably the outer edges of the screen or grid are exposed and turned angularly to provide fingers for engaging the adjacent nickel cell partition. The fingers may be welded to the partitions if desired, or the face of the electrode may be spot welded to the spacer. Preferably the nickel cell partitions are slightly larger than the electrodes so that the insulating multi-layer edge coatings on the partitions do not prevent electrical connection between the grids of the positive plates and the adjacent nickel surfaces of the cell partitions. The negative sponge zinc plates are pressed directly into physical engagement with the nickel cell partitions adjacent to them, and the two may be spot welded together, if desired. The nickel, in the environment disclosed, is relatively inert electrochemically and does not form an active cell in combination with the silver peroxide positive electrode or the zinc negative electrode in the presence of the sodium hydroxide electrolyte.

In a pile battery of the type disclosed with nickel end plates, terminals 19 for electrical connections can be attached to the end plates. Alternatively, if desired, plastic end plates may be used and provided with conventional terminals. After assembly, a battery of the type disclosed is stored dry and activated only immediately prior to use, although the silver peroxide zinc batteries may be used as storage batteries for limited purposes. Since the battery herein disclosed is not intended primarily for use as a storage battery, the casing 10 is provided with a narrow slot 20 through which the electrolyte is introduced just prior to the time of use of the battery.

By means of the nickel partitions and the edge coating which bonds them to the plastisol case, a very dependable and rugged silver peroxide zinc battery is rendered commercially practical. These batteries may be fabricated by quantity production methods with little or no danger of failure of electrical connections between adjacent cells and with adjacent cells assuredly insulated from one another electrolytically. Further, the battery is a rugged light battery which, by virtue of its silver peroxide, sponge zinc electrochemical system, provides high output of electrical power in relation to weight, all of which renders the battery highly suitable for use on airborne equipment.

Having described my invention, I desire to be limited only by the following claims:

1. A cell partition for a silver peroxide, zinc battery of the type disclosed, said partition having an exposed nickel surface and having its edges coated with a film of Pliobond 20, over which is a film of Koroseal, over which is a film of Corrosite.

2. A battery of the pile type, comprising a series of electrolytic cells connected in series, each cell constituted by a silver peroxide positive electrode, a zinc negative electrode and a bibulous electrode spacer adapted to hold electrolyte, nickel surfaced cell partitions between adjacent cells, each cell partition physically engaging and being electrically connected to a negative electrode on one side and a positive electrode on the other side, each cell partition having its edges coated with sequential films of Pliobond 20, Koroseal and Corrosite, and at least two walls of thermally hardened vinyl plastisol on opposite sides of the battery, the edges of the cell partitions with their outer films of Corrosite being imbedded in and bonded to said plastisol walls.

References Cited in the file of this patent

UNITED STATES PATENTS

| | | |
|---|---|---|
| 2,081,926 | Gyuris | June 1, 1937 |
| 2,307,761 | Deibel | Jan. 12, 1943 |
| 2,620,369 | Daniel | Dec. 2, 1952 |
| 2,699,461 | Wilke | Jan. 11, 1955 |